May 13, 1924.
F. S. GREENE
ARC WELDING MACHINE
Filed Feb. 21, 1921
1,493,529
2 Sheets-Sheet 1
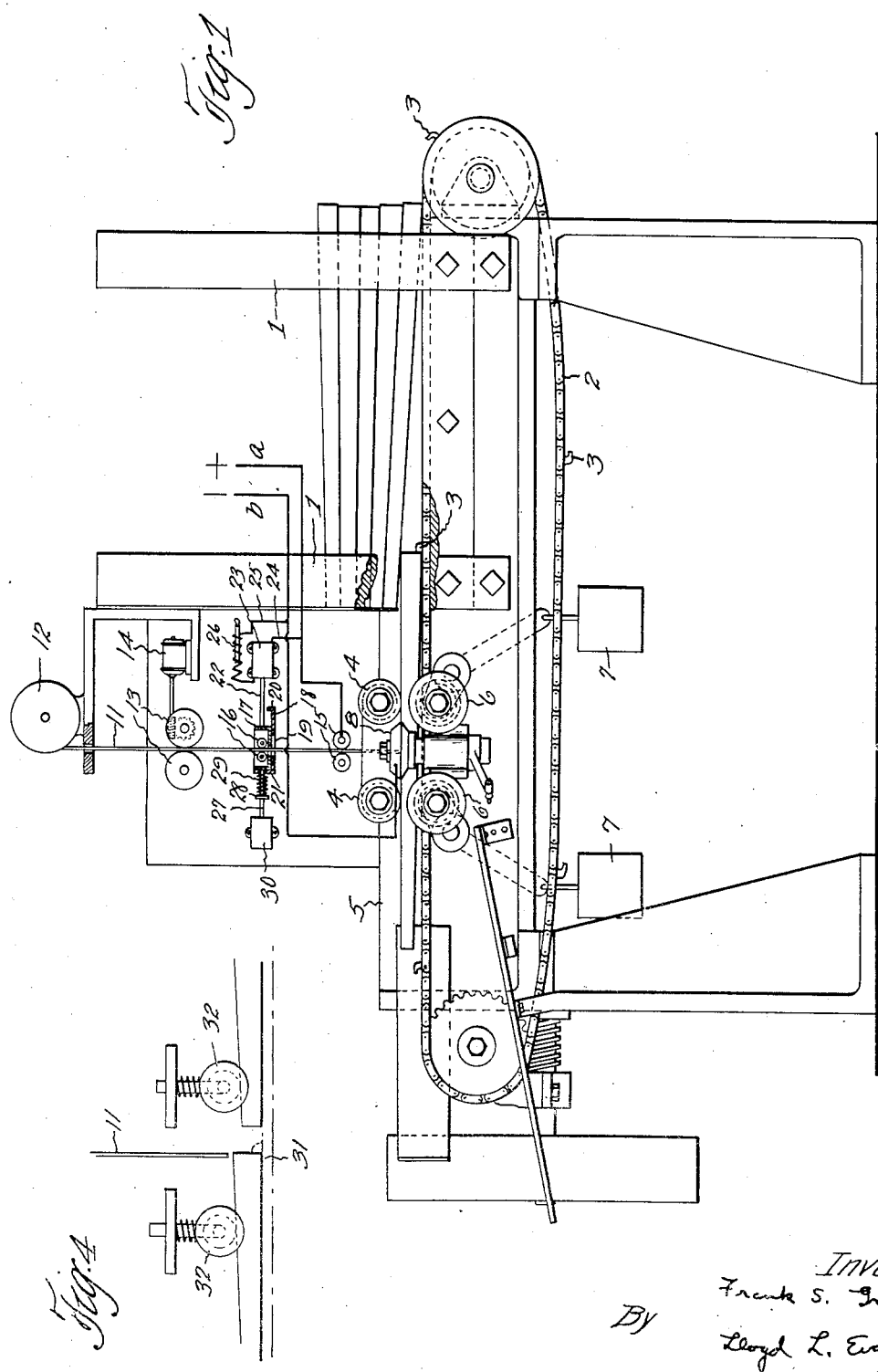

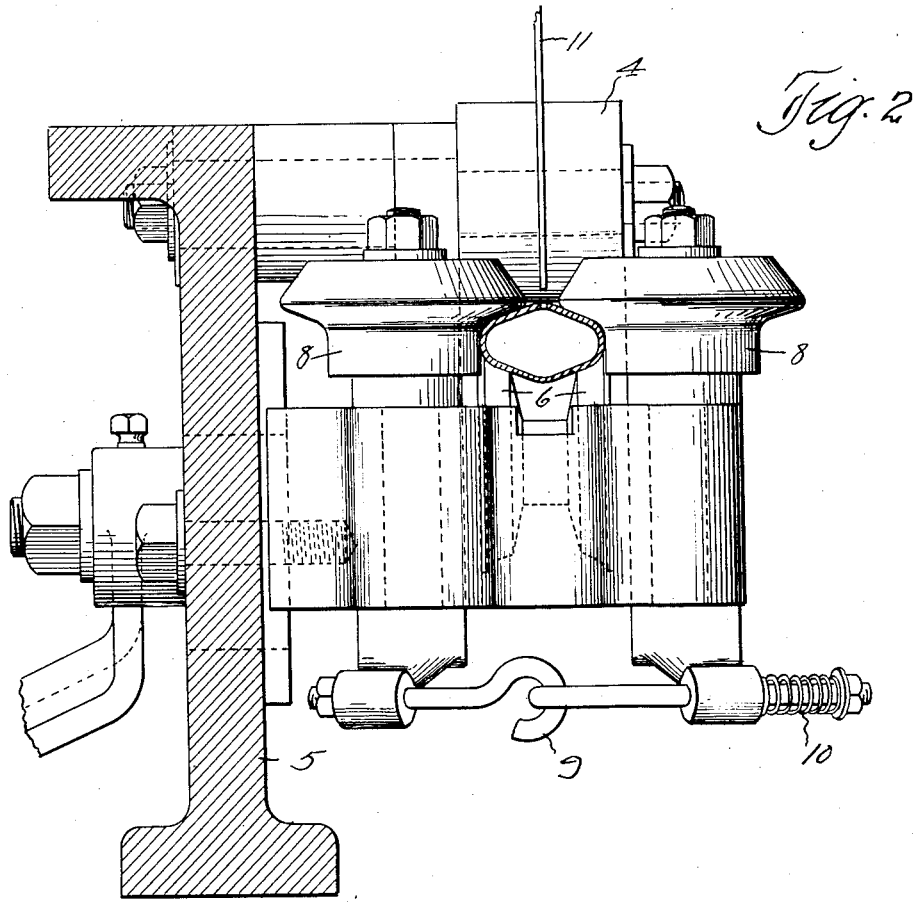
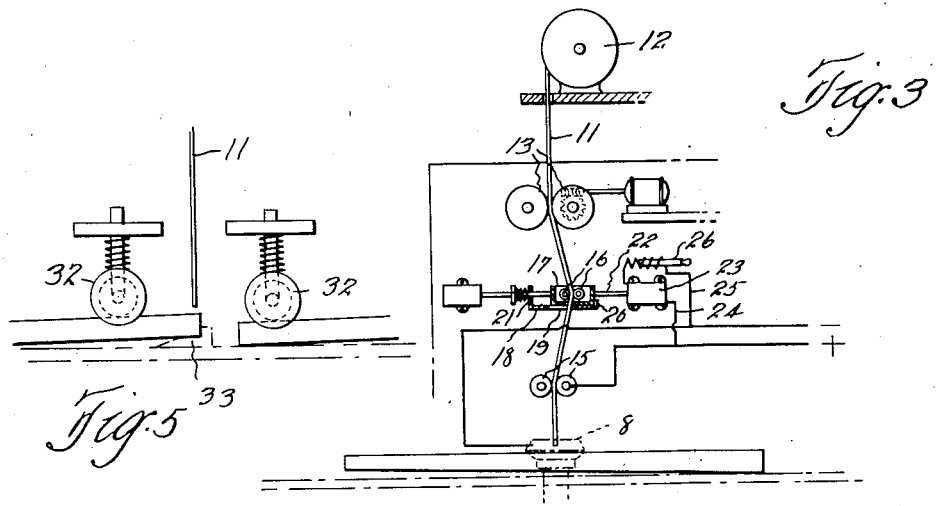

Patented May 13, 1924.

1,493,529

UNITED STATES PATENT OFFICE.

FRANK S. GREENE, OF CLEVELAND, OHIO, ASSIGNOR TO THE HYDRAULIC STEEL COMPANY, OF CLEVELAND, OHIO, A CORPORATION OF OHIO.

ARC-WELDING MACHINE.

Application filed February 21, 1921. Serial No. 446,553.

*To all whom it may concern:*

Be it known that I, FRANK S. GREENE, a citizen of the United States, residing at Cleveland, in the county of Cuyahoga and State of Ohio, have invented a certain new and useful Improvement in Arc - Welding Machines, of which the following is a full, clear, and exact description, reference being had to the accompanying drawings.

This invention relates to arc welding machines of the automatic type.

The general object of the invention is to simplify the automatic electrode manipulating devices making a cheaper machine whose operation is more efficient and which is capable of performing operations not possible with prior machines.

More especially, an object of this invention is to provide means entirely independent of the electrode feeding means for striking the arc.

A further object is to provide means independent of the electrode feeding means for automatically regulating the length of the arc.

A further object is to provide a machine capable of welding a series of articles as they are continuously fed past the electrode.

A further object is to provide an electrode controlling device operable to immediately restrike the arc, should the arc be broken during the passage of an article therebeneath.

In the accompanying drawings,

Figure 1 is a side elevation of the machine.

Fig. 2 is a sectional detail view showing the tube guide rolls.

Fig. 3 is a diagrammatic view showing the electrode and electrode shifting device in the position taken immediately upon the striking of the arc.

Figs. 4 and 5 are views showing modifications of the feeding and guiding devices.

The tube feeding and guiding mechanism herein shown is old and well known, the particular mechanism shown being that disclosed in Patent Number 1,356,054, October 19, 1920, granted to William R. Edwards. Many other old and well known feeding devices could be used.

As shown in Fig. 1, the short tubes to be welded are stacked in a magazine 1. An endless belt 2 travels across the bottom of the magazine and has hooks 3 which engage and push out the bottom tube. For engaging the tops of the tubes adjacent the welding point are a pair of stationary rolls 4 mounted on side rail 5. For engaging the bottoms of the tubes are a pair of rolls 6 mounted on eccentric shafts to which are attached weights 7 which hold the rolls 6 against the bottom of the tubes and press the tube against the stationary rolls 4. For engaging the sides of the tube adjacent the welding point are a pair of rollers 8 mounted upon vertical eccentric shafts which are connected by links 9 having a spring 10 acting upon the eccentric shafts to press the rollers 8 toward each other whereby the tube is gripped between them.

For welding the seams of the tubes a wire electrode 11, wound upon a suitable drum 12 is fed to the work by a pair of feed rolls 13 as is well known in the art. The feed rolls 13 are driven by any suitable mechanism such as a small electric motor 14. The motor 14 may be independently driven or driven in synchronism with the motor driving the feed conveyor or it may be connected with the welding circuit in any of the several ways known in the art to regulate the speed thereof by the electrical conditions in the welding circuit.

Near the work is a pair of guide rolls 15 mounted on fixed pintles.

As shown, the positive lead "*a*" is connected to the electrode wire through the rolls 15 and the negative lead "*b*" to the work through rollers 8. As well understood in the art, the polarity may be reversed.

Between the feed rolls 13 and guide rolls 15 is mounted the electrode shifter which operates to bow the wire sufficiently to withdraw the lower end thereof from the work a sufficient distance to strike an arc. A pair of small guide rollers 16 are mounted upon a sliding carriage 17 movable in a fixed guide 18 having a slot 19 and limiting stops 20 and 21. Connected to one side of the sliding carriage is a rod 22 forming the core of the solenoid 23 which is connected across the welding circuit by lines 24 and 25. In one of these lines is an adjustable resistance 26 to regulate the pull of the solenoid. On the opposite side of the sliding carriage 18 is connected a rod 27 having a nut 28 thereon. Between the nut 28 and stop 21 is mounted a compression spring 29 to resist the pull of the solenoid 23 and to return the carriage to normal position when released by the solenoid. Adjustment of the nut 28 regulates the compression of the spring. The outer end of the rod 27 is connected to a dash pot 30 which prevents sudden movements of the carriage in either direction.

Fig. 4 shows a modification in which the tapered tubes are held down on the conveyor by spring pressed rolls 32 and a drop is provided between the large end of the tube as it passes out from beneath the electrode and the small end of the next incoming tube, so that the electrode 11 may straighten out without danger of the end projecting down between the two tubes. In this form any irregularity in the rate of flow of metal from the electrode tip will be compensated for in the striking of a new arc, the end of electrode 11 striking the small end of the tube at varying distances from the end thereof.

Fig. 5 shows a conveyor for tubes of uniform diameter in which the same result is obtained by means of a shouldered lug 33 which holds the rear end of the tube slightly elevated.

Operation.

The conveyor 2 is operated to bring the forward end of a tube beneath the electrode 11 and the electrode feeder is then started causing the electrode 11 to contact with the tube. This causes a heavy current to pass through the work from lead "a" to lead "b" and through solenoid 23 shifting the carriage 18 toward the position shown in Fig. 3. The bowing out of a portion of the wire causes the lower end to withdraw from the work striking an arc. As the arc lengthens due to the pull of the solenoid the resistance across the arc increases and the current through the solenoid 23 is weakened until the pull of the solenoid is balanced by the spring 29. Meanwhile the electrode 11 is being fed at a substantially constant rate by the feed rolls 13 which compensates for the loss of metal at the tip of the electrode. Should the metal feed off the tip too slowly the arc will tend to shorten but the increase of the current through the solenoid will bow the electrode wire more and vice versa if the metal feeds off faster than the normal rate the arc will lengthen, current through the solenoid will decrease and spring 29 will pull the carriage back against the action of the solenoid to lessen the bow in the wire and shorten the arc. Thus the shifting mechanism not only strikes the arc but also automatically regulates the length thereof during operation.

Should the arc be broken during operation the current through solenoid 23 will cease and spring 29 will straighten the wire, bringing it quickly into contact with the work which causes the arc to be quickly restruck.

As the rear end of a tube passes from under the electrode 11 the arc is of course broken and the shifting mechanism restored to normal position straightening the wire and bringing it in position to strike the end of the incoming tube to repeat the previously described operation thereon. The speed of the feed rolls 13 may be so regulated that the rate of feed of the electrode lags a little behind the rate of flow of the metal from the tip which will result in the wire being nearly straight when the rear end of the tube is reached so that there is no danger of the electrode feeding down too far during the interval between the passage of the rear end of one tube and the entrance of the front end of the next tube. However, in the modifications shown in Figs. 4 and 5 no such adjustment is necessary in view of the drop provided between the ends of the tubes.

Having described my invention, what I claim is:

1. In an arc welding machine, a flexible electrode, work holding means adjacent the electrode and means to flex the electrode to withdraw the end thereof from the work to strike an arc.

2. In an arc welding machine, a flexible electrode, work holding means adjacent the electrode, and means to flex the electrode to draw an arc and operable to vary the flexure thereof to control the length of the arc.

3. In an arc welding machine, a flexible electrode, feeding means therefor, a work support, guiding means between the feeding means and support, and means to shift said guiding means to control the distance between the end of the electrode and the work.

4. In an arc welding machine, a flexible electrode, feeding means therefor, a work support, means for effecting relative movement between the electrode and work, an electric curcuit including the electrode and work for effecting the welding, and means controlled by the welding circuit for flexing the electrode to draw an arc.

5. In an arc welding machine, a flexible electrode, feeding means therefor, a work support, means for effecting relative movement between the electrode and work, an electric circuit including the electrode and work for effecting the welding, and means controlled by the welding circuit for varying the flexure of the electrode to control the length of the arc.

6. In an arc welding machine, an electrode, a work support, a welding circuit including therein the electrode and the work, means for feeding the electrode toward the work, means for bringing successive portions of the work adjacent the electrode, electrode shifting means active upon passage of current through the welding circuit to draw an arc between the electrode and work and a second electrode shifting means operative upon the release of said first shifting means to move the electrode toward the work.

7. In an arc welding machine, a wire electrode, work feeding means, a welding circuit including therein the electrode and work, means for feeding the wire and the work at definite fixed relative speeds and means independent of the said feeding means for drawing an arc and regulating the length thereof.

8. In an arc welding machine, a flexible electrode, a support therefor, and means for flexing the electrode to draw an arc and to regulate the length thereof.

9. In an arc welding machine, a movable electrode, a movable shifter for moving the electrode, a solenoid for moving the shifter in one direction and a spring opposing such movement of the shifter.

10. In an arc welding machine, a movable electrode, a movable shifter for moving the electrode, a solenoid controlled by the welding circuit for moving the shifter in one direction, a spring opposed to the solenoid to return the shifter and a dash pot retarding the movement of the shifter in either direction.

In testimony whereof, I hereunto affix my signature.

FRANK S. GREENE.